(12) United States Patent
Kromrey et al.

(10) Patent No.: US 10,961,931 B2
(45) Date of Patent: Mar. 30, 2021

(54) DECELERATION CYLINDER CUTOFF SYSTEM INCLUDING SMART PHASER

(71) Applicant: GM GLOBAL TECHNOLOGY OPERATIONS LLC, Detroit, MI (US)

(72) Inventors: Chad D. Kromrey, Perry, MI (US); Nathan M. Picot, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 105 days.

(21) Appl. No.: 16/233,373

(22) Filed: Dec. 27, 2018

(65) Prior Publication Data

US 2020/0018251 A1 Jan. 16, 2020

Related U.S. Application Data

(60) Provisional application No. 62/697,729, filed on Jul. 13, 2018.

(51) Int. Cl.
*F02D 41/00* (2006.01)
*F02D 17/02* (2006.01)
*F01L 1/344* (2006.01)
*F01L 13/00* (2006.01)

(52) U.S. Cl.
CPC ........ *F02D 41/0087* (2013.01); *F01L 1/3442* (2013.01); *F01L 13/0005* (2013.01); *F02D 17/02* (2013.01); *F02D 41/0005* (2013.01); *F01L 2013/001* (2013.01); *F02D 2041/0012* (2013.01)

(58) Field of Classification Search
CPC .. F02D 13/0226; F02D 13/0234; F02D 13/06; F02D 17/02; F02D 41/0087; F02D 2041/0012
See application file for complete search history.

(56) References Cited

U.S. PATENT DOCUMENTS

| | | | |
|---|---|---|---|
| 8,833,058 B2 | 9/2014 | Ervin et al. | |
| 2003/0172900 A1* | 9/2003 | Boyer | F02D 41/0087 123/198 F |
| 2013/0008412 A1* | 1/2013 | Kidooka | F02D 13/08 123/481 |
| 2017/0114729 A1* | 4/2017 | Ashikaga | F02D 13/06 |
| 2017/0356369 A1* | 12/2017 | Doering | F02D 41/1406 |
| 2018/0187611 A1* | 7/2018 | Gerow | F02D 13/0234 |
| 2019/0003410 A1* | 1/2019 | Tsunoda | F01L 13/0036 |

FOREIGN PATENT DOCUMENTS

| | | |
|---|---|---|
| DE | 102013206365 A1 | 10/2013 |
| DE | 102016200089 A1 | 7/2016 |

* cited by examiner

*Primary Examiner* — Sizo B Vilakazi
*Assistant Examiner* — Anthony L Bacon
(74) *Attorney, Agent, or Firm* — Cantor Colburn LLP (57) ABSTRACT

An internal combustion engine includes a cylinder and a valve assembly configured to activate and deactivate the at least one cylinder. The valve assembly includes an intake valve configured to control air flow into the at least one cylinder. A controller outputs a first control signal to the valve assembly to deactivate the at least one cylinder in response to detecting a deceleration event. The controller also outputs a second control signal to command the valve assembly to delay opening the intake valve from a closed position after re-activating the cylinder so that the torque output produced in response to re-activating the cylinder is reduced.

17 Claims, 4 Drawing Sheets

DECELERATION CYLINDER CUTOFF SYSTEM INCLUDING SMART PHASER

CROSS-REFERENCE TO RELATED APPLICATIONS

The present application claims priority to U.S. Provisional Application No. 62/697,729, filed on Jul. 13, 2018, the contents of which are incorporated by reference herein in its entirety.

INTRODUCTION

The subject disclosure relates generally to automotive vehicle control systems, and more particularly, to engine control systems.

Various engine control systems have been developed over the years to improve the fuel economy of an automotive vehicle. Deceleration cylinder cutoff (DCCO) is an engine control strategy recently employed in some automotive engine designs. DCCO deactivates one or more cylinders when no torque request is present, e.g., when the accelerator pedal is not depressed during deceleration of an engine. Because the cylinders are deactivated, pumping losses that are known to occur in fully activated engines are reduced, thereby improving fuel economy. DCCO further improves fuel economy because large volumes of air are not pumped through the deactivated cylinders and into the exhaust system.

DCCO achieves improved fuel economy in part due to the reduction of pumping losses, which are known to occur when pumping air through activated cylinders. DCCO does not require fuel loading to perform Catalyst Oxygen Storage Compensation (COSC) when exiting the DCCO mode, thereby provided improved fuel economy compared to Deceleration Fuel Cut Off (DFCO) systems.

SUMMARY

In one non-limiting embodiment, an internal combustion engine includes a cylinder and a valve assembly configured to activate and deactivate the at least one cylinder. The valve assembly includes an intake valve configured to control air flow into the at least one cylinder. A controller outputs a first control signal to the valve assembly to deactivate the at least one cylinder in response to detecting a deceleration event. The controller also outputs a second control signal to command the valve assembly to delay opening the intake valve from a closed position after re-activating the cylinder so that the torque output produced in response to re-activating the cylinder is reduced.

In addition to one or more of the features described herein, the internal combustion engine further includes a piston slidably disposed in the at least one cylinder. The controller outputs the second control signal based on a position of the piston after re-activating the at least one cylinder.

In addition to one or more of the features described herein, the controller outputs the second control signal in response to the position of the piston reaching a position threshold.

In addition to one or more of the features described herein, an amount of air drawn into the at least one cylinder meets an air target value in response to opening the intake valve.

In addition to one or more of the features described herein, the air target value changes based on at least one current operating condition of the vehicle.

In addition to one or more of the features described herein, the air target value is less than a maximum sweep volume of the at least one cylinder, and wherein the at least one current operating condition includes engine speed and intake manifold pressure.

In addition to one or more of the features described herein, the electronic controller re-activates the at least one cylinder in response to detecting a torque request, and the internal combustion engine combusts a mixture of fuel and the amount of air set at the air target value in response to re-activating the at least one cylinder.

According to another non-limiting embodiment, an engine control system includes at least one cylinder including a piston slibably disposed therein. A valve assembly is configured to activate and deactivate at least one cylinder. The valve assembly includes an intake valve configured to control airflow into the at least one cylinder. A deceleration cylinder cutoff (DCCO) controller is configured to output a deactivation control signal to the valve assembly to deactivate the at least one cylinder in response to detecting a deceleration event. The DCCO controller outputs a valve close control signal to the valve assembly to close the intake valve in response to deactivating the at least one cylinder and outputs a valve open control signal to the valve assembly to delay opening the intake valve based on a position of the piston after re-activating the at least one cylinder.

In addition to one or more of the features described herein, delaying the opening of the intake valve draws a reduced amount of air into the at least one cylinder after re-activating the at least one cylinder.

In addition to one or more of the features described herein, the reduced amount of air equals an air target value.

In addition to one or more of the features described herein, the DCCO controller outputs the valve open control signal in response to the position of the piston reaching a position threshold.

In addition to one or more of the features described herein, the position threshold is a position that is half-way through a first stroke of the piston after re-activating the cylinder.

In addition to one or more of the features described herein, the DCCO controller outputs the cylinder activation control signal to re-activate the at least one cylinder in response to detecting a torque request.

In addition to one or more of the features described herein, a mixture of fuel and the amount of air being equal to the air target value is combusted in response to re-activating the at least one cylinder.

According to still another non-limiting embodiment, a method is provided to control an internal combustion engine. The method includes displacing a piston that is slidably disposed in a cylinder of the internal combustion engine, and controlling air flow into the cylinder via an intake valve controlled by a valve assembly. The method further includes detecting, via a deceleration cylinder cutoff (DCCO) controller, a deceleration event of the internal combustion engine. The method further includes outputting, via the DCCO controller, a deactivation control signal to command the valve assembly to deactivate the cylinder in response to detecting the deceleration event. The method further includes outputting, via the DCCO controller, a valve open control signal to the valve assembly to delay opening the intake valve based on a position of the piston after re-activating the cylinder.

In addition to one or more of the features described herein, the method further includes drawing a reduced amount of air into the cylinder in response to delaying opening of the intake valve.

In addition to one or more of the features described herein, the reduced amount of air drawn into the cylinder equals an air target value.

In addition to one or more of the features described herein, the method further includes outputting, via the DCCO controller, the valve open control signal in response to determining the position of the piston reaches a position threshold so that the reduced amount of air is less than a maximum sweep volume of the cylinder.

In addition to one or more of the features described herein, the method further includes monitoring a first stroke of the piston after re-activating the cylinder, and determining the position threshold is reached in response to detecting the position of the piston is half-way through the first stroke.

In addition to one or more of the features described herein, the method further includes detecting a torque request while the cylinder is deactivated, outputting, via the DCCO controller, the cylinder activation control signal to re-activate the cylinder in response to detecting a torque request, and combusting a mixture of fuel and the reduced amount of air being equal to the air target value in response to re-activating the cylinder.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Previously designed Deceleration cylinder cutoff (DCCO) systems attempted to manage fuel economy by closing the throttle valve, controlling spark timing, and/or disabling fuel injection to reduce torque output from an engine. The throttle valve regulates the air into the intake manifold, but cannot regulate airflow downstream from the valve and therefore cannot control torque output. The spark control system has limited torque control due to misfire and emissions concerns. Fuel disablement can reduce torque to some extent. However, disabling fuel during the DCCO mode allows for additional air to enter the cylinders, thereby increasing torque output upon DCCO exit.

Previously designed DCCO systems are also unable to adequately control excessive torque output because the intake valves open immediately to draw in a fresh charge of air immediately upon DCCO exit. As a result, the maximum available air charge is drawn into the cylinders, and is combusted resulting in excessive and uncontrolled torque output. This excessive torque output causes significant disturbances, vibrations, and noise that are noticeable to the driver. The excessive torque also results in reduced fuel economy, undesired emissions, and negative diagnostic compliance impacts, which limits the practicality of utilizing DCCO technology in production.

Various non-limiting embodiments described herein provide an engine control system that includes a smart phaser control strategy. The smart phaser control strategy is configured to actively adjust the camshaft phaser(s) in response to invoking the DCCO mode. In at least one embodiment, the phaser control strategy actively modifies the valve timing to delay opening the intake valves during the piston stroke following re-activation of the cylinders. In this manner, the smart phaser control strategy introduces a reduced amount of air in the cylinders compared to previously designed DCCO systems, thereby producing less torque when combusted following exit of the DCCO mode. The reduced torque mitigates undesirable disturbances, vibrations, and noise previously noticeable to the driver. The reduced output torque also results in improved emission compliance, fuel economy, and diagnostics.

Figure 1:
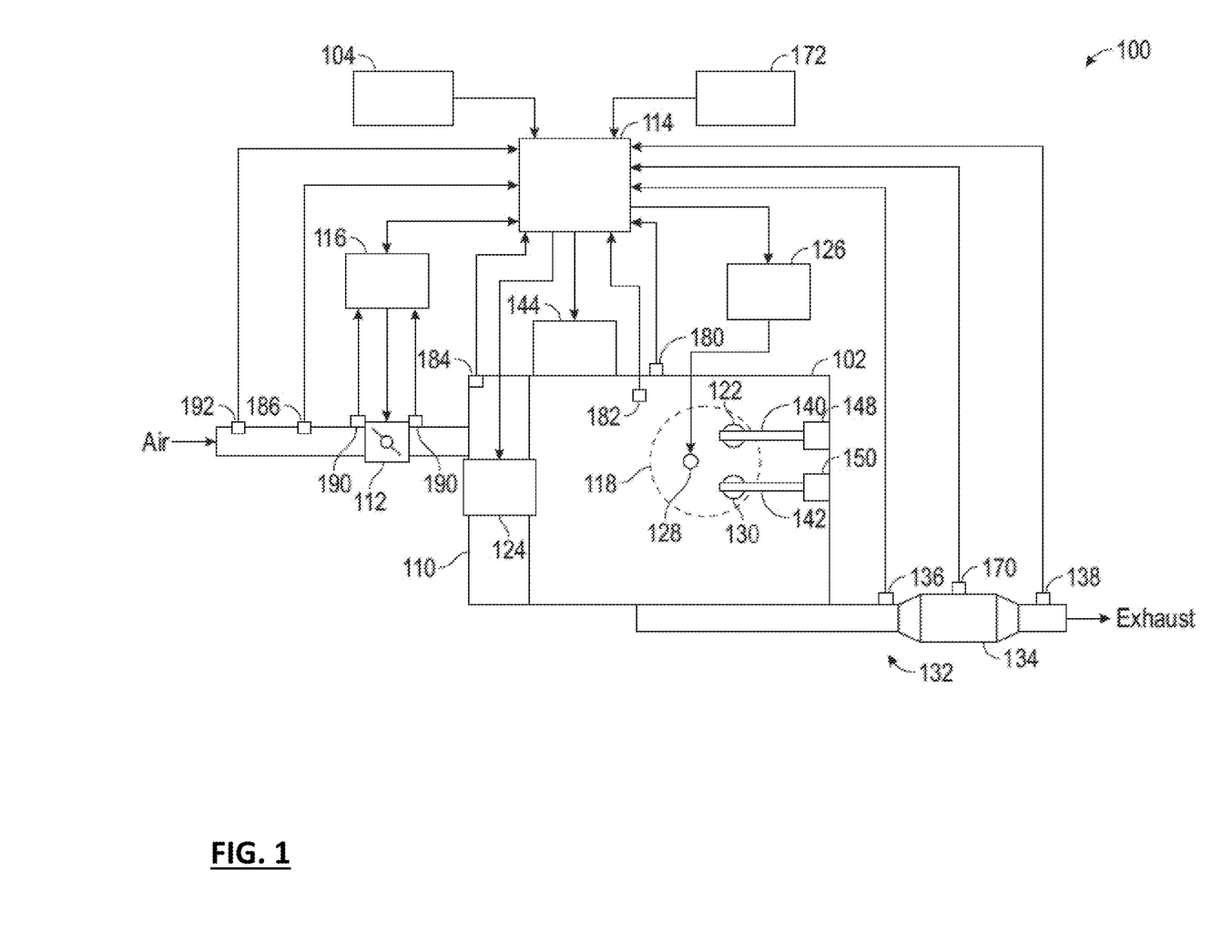
FIG. 1 is a block diagram illustrating an engine system according to a non-limiting embodiment.

Referring now to FIG. 1, a functional block diagram of an exemplary engine system 100 is illustrated according to a non-limiting embodiment. The engine system 100 includes an engine 102 that combusts an air/fuel mixture to produce drive torque for a vehicle based on a request from a driver input module 104. For example, the driver input module 104 may output a position signal based on a position of an accelerator input device, such as an accelerator pedal.

The engine 102 draws air into an intake manifold 110 through a throttle valve 112. The throttle valve 112 may include, for example, a butterfly valve having a rotatable blade. An engine control module (ECM) 114 controls a throttle actuator module 116, which regulates opening of the throttle valve 112 to control the amount of air drawn into the intake manifold 110. Air from the intake manifold 110 flows into cylinders 118 of the engine 102. The engine 102 may include, for example, 2, 3, 4, 5, 6, 8, 10, and/or 12 cylinders. While the engine 102 may include multiple cylinders, for illustration purposes a single representative cylinder 118 is shown.

An intake valve 122 regulates the flow of air from the intake manifold 110 into the cylinder 118. The ECM 114 controls a fuel actuator module 124, which regulates fuel injection to achieve a desired air/fuel ratio. Fuel may be injected into the intake manifold 110 at a central location or at multiple locations, such as near the intake valve of each of the cylinders. In various implementations, fuel may be injected directly into the cylinders 118 or into mixing chambers associated with the cylinders 118. The fuel actuator module 124 may halt injection of fuel to cylinders 118 during a fuel cutoff mode.

The injected fuel mixes with air and creates an air/fuel mixture in the cylinder 118. A piston (not shown) within the cylinder 118 compresses the air/fuel mixture. Based upon a signal from the ECM 114, a spark actuator module 126 may energize a spark plug 128 in the cylinder 118, which ignites the air/fuel mixture. The timing of the spark may be specified relative to the time when the piston is at its topmost position, referred to as top dead center (TDC). In diesel engines, the spark actuator module 126 and spark plug 128 may be omitted.

The combustion of the air/fuel mixture drives the piston down, thereby driving a rotating crankshaft (not shown). The piston then begins moving up again and expels the byproducts of combustion through an exhaust valve 130. The byproducts of combustion including exhaust gas are exhausted from the vehicle via an exhaust system 132.

A catalyst 134 in the exhaust system 132 reduces amounts of gases such as CO, HC, and NOx emitted by the engine 102. The catalyst 134 reduces the amounts of the gases by catalyzing a reaction between the gases and oxygen. The catalyst 134 includes a property known as oxygen storage capacity (OSC). OSC refers to an ability of the catalyst 134 to store a targeted amount of oxygen when the engine 102 operates under lean conditions and to release oxygen when the engine 102 operates under rich conditions. The amount of oxygen stored by the catalyst may be referred to as an oxygen storage amount. Lean conditions may occur when the ratio of the air/fuel mixture is greater than a stoichiometric air/fuel mixture. Rich conditions may occur when the ratio of the air/fuel mixture is less than a stoichiometric air/fuel mixture.

The vehicle system 108 may operate in a fuel cutoff mode in which the fuel actuator module 124 cuts off fueling (i.e., stops fuel flow) to one or more cylinders 118. The cylinder actuator controller 144 can invoke the fuel cutoff mode in response to detecting an "overrun" or "deceleration" condition. For example, a vehicle traveling with no throttle input from the driver (i.e., no input to the accelerator input device) and the engine 102 acting as a brake (i.e., producing negative torque) may be described as operating in the overrun or deceleration condition. When deceleration conditions are present, fueling may be disabled in a deceleration fuel cutoff (DFCO) mode. DFCO mode may be implemented to increase fuel economy and/or increase engine braking. During DFCO mode, the engine 102 pumps air through the exhaust system 132, resulting in delivery of oxygen to the catalyst 134.

Oxygen sensors 136 and 138 may be used to determine amounts of oxygen in the exhaust gas. The oxygen sensors generate oxygen signals that indicate oxygen amounts in the exhaust gas. A first oxygen sensor 136 may generate an upstream oxygen signal that indicates an oxygen amount upstream from the catalyst 134. A second oxygen sensor 138 may generate a downstream oxygen signal that indicates an oxygen amount downstream from the catalyst 134. The ECM 114 may determine the oxygen storage amount based on the upstream and/or the downstream oxygen signals.

An intake camshaft 140 drives the opening and closing of the intake valve 122. An exhaust camshaft 142 drives the opening and closing of the exhaust valve 130. Intake cam phasers 148 and exhaust cam phasers 150 can adjust the angle of the intake camshaft 140 and the exhaust camshaft 142, respectively, which in turn controls the opening and closing timings of the intake valve 122 and the exhaust valve 130.

In various implementations, multiple intake camshafts may drive multiple intake valves per cylinder and/or may drive the intake valves of multiple banks of cylinders. Similarly, multiple exhaust camshafts may drive multiple exhaust valves per cylinder and/or may drive exhaust valves for multiple banks of cylinders. Although dual camshafts are illustrated in FIG. 1, it should be appreciated that some embodiments allow for a single camshaft capable of driving the opening and closing of the intake valve 122 and the exhaust valve 130.

The cylinder actuator controller 144 invokes a DCCO mode, which deactivates the cylinder 118 by disabling opening of the intake valve 122 and/or the exhaust valve 130. In various implementations, the cylinder actuator controller 144 can control a hydraulic system that selectively decouples the intake valves 122 and/or exhaust valves 130 from the corresponding camshafts 140 and 142 for one or more cylinders 118 in order to deactivate those cylinders. For example, valves for half of the cylinders can be either hydraulically coupled or decoupled as a group by the cylinder actuator controller 144. The time at which the intake valve 122 is opened may be varied with respect to piston TDC by an intake cam phaser 148. The time at which the exhaust valve 130 is opened may be varied with respect to piston TDC by an exhaust cam phaser 150. The cylinder actuator controller 144 may control the intake cam phaser 148 and the exhaust cam phaser 150 based on signals from the ECM 114. Accordingly, the intake cam phaser 148 and/or exhaust cam phaser 150 can be actively advanced or retarded to vary the timing at which to open or close the intake valve 122 and/or exhaust valve 130 with respect to the position of the piston.

In at least one embodiment, the cylinder actuator controller 144 adjusts the duration at which the intake valve 122 is open or closed when invoking and exiting the DCCO mode. In response to invoking the DCCO mode, for example, the intake cams of an associated cylinder 118 can be disengaged so that the intake valves are closed. However, the intake cam phaser 148 can still be adjusted to pre-set the intake valve 122 to a targeted angle that will take effect after exiting the DCCO mode.

In at least one embodiment, the intake valve 122 remains closed until the DCCO mode is exited and the following stroke of the piston (i.e., the movement of the piston that occurs after invoking the DCCO mode) reaches a threshold position. The threshold position includes, but is not limited to, half-way through the intake stroke. In one or more embodiments, an engine including a plurality of intake valves corresponding to a plurality of cylinders (e.g., 4 cylinders), the intake valves can be ramped in or gradually opened at different times with respect to one another based on the input torque request from the driver (i.e., based on the driver's tip-in input). Once the piston position threshold is reached, the valves are re-engaged and begin operating at the pre-set position. Accordingly, a reduced amount of air is drawn into the cylinder 118 during the intake stroke compared to previously designed DCCO schemes which draw a full charge of air into the cylinder immediately upon exiting the DCCO mode.

The reduced amount of air results in lower output torque at DCCO mode exit, thereby reducing undesired disturbances, vibrations, and noise previously noticeable to the driver. The reduced output torque also results in improved emission compliance, fuel economy, and diagnostics. For instance, the inability of previously designed DCCO systems to prevent air from entering the cylinders upon exiting the DCCO mode results in large amounts of air flowing through the exhaust system 132, which required rebalancing the catalyst 134. To achieve this catalyst rebalance, a large amount of fuel is injected into the cylinders 118 upon exit of the DCCO mode, which causes reduced overall fuel economy. The DCCO system including the smart phaser described herein reduces or fully avoids the need to rebalance the catalyst 134 due to the reduced amount of air drawn into the cylinder 118 when invoking and exiting DCCO.

The cylinder actuator controller 144 may also determine a desired air per cylinder (APC), current engine RPM and/or manifold intake pressure. Based on the desired APC, the current engine RPM and/or the manifold intake pressure, the cylinder actuator controller 144 can control positions of the intake and/or exhaust cam phasers 148 and 150 to pre-set the position of the intake valve 122 and exhaust valve 130, respectively, which will then take effect after exiting the DCCO mode The engine system 100 may employ various sensors that provide monitored data to the ECM 114, which in turn can output various control signals and/or data signals. For example, a temperature sensor 170 may indicate the temperature (TC) of the catalyst 134. A vehicle speed sensor 172 may indicate the speed of the vehicle (VS) based on a rotational velocity of a drive wheel or an output speed of a transmission. An RPM sensor 180 may measure the speed of the crankshaft in revolutions per minute (RPM). An engine coolant temperature (ECT) sensor 182 may indicate a temperature of coolant in the engine 102 and/or the engine 102. The ECT sensor 182 may be located within the engine 102 or at other locations where the coolant is circulated, such as a radiator (not shown).

A manifold absolute pressure (MAP) sensor 184 may indicate pressure within the intake manifold 110. In various implementations, the MAP sensor 184 may measure engine vacuum, which is the difference between ambient air pressure and the pressure within the intake manifold 110. A mass airflow (MAF) sensor 186 measures a mass flow rate of air flowing into the intake manifold 110. In various implementations, the MAF sensor 186 may be located in a housing that also includes the throttle valve 112.

The throttle actuator module 116 may monitor the position of the throttle valve 112 using one or more throttle position sensors (TPS) 190. An intake air temperature (IAT) sensor 192 may measure the ambient temperature of air being drawn into the engine 102. Other sensors 194 may include other temperature sensors in the exhaust system 132, camshaft position sensors, and other engine sensors.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting the angle of the blade of the throttle valve 112.

Similarly, the spark actuator module 126 may be referred to as an actuator, while the corresponding actuator value may be the amount of spark advance relative to cylinder TDC. Other actuators may include the fuel actuator module 124 and the cylinder actuator controller 144. For these actuators, the actuator values may correspond to fueling rate and number of cylinders and/or valves activated, respectively. The ECM 114 may control actuator values in order to generate a desired torque from the engine 102. The ECM 114 may control actuator values to implement the enrichment reduction system of the present disclosure.

Figure 2:
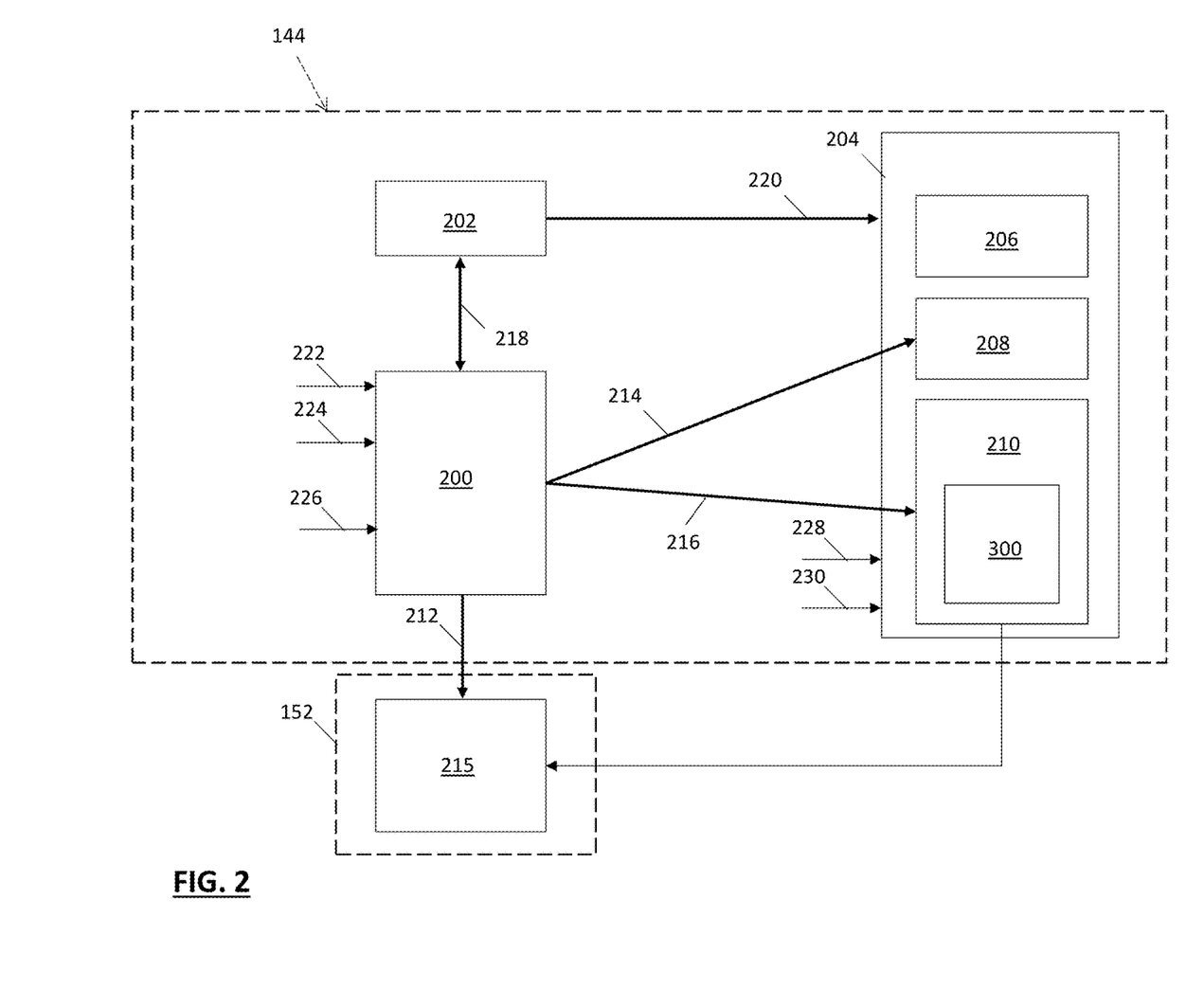
FIG. 2 is a block diagram illustrating a cylinder actuator module included in the engine system according to a non-limiting embodiment.

FIG. 2 is a block diagram illustrating a cylinder actuator controller 144 included in an engine system 100 (see FIG. 1) according to a non-limiting embodiment of the present teachings. The cylinder actuator controller 144 includes a DCCO module 200, a DFCO module 202, and an engine torque module 204. In at least one embodiment, the engine torque module 204 can further include a spark control module 206, a throttle control module 208, and a phaser control module 210. Any one of the cylinder actuator controller 144, the DCCO module 200, the DFCO module 202, the engine torque module 204, the spark control module 206, the throttle control module 208, and the phaser control module 210 can be constructed as an electronic hardware controller that includes memory and a processor configured to execute algorithms and computer-readable program instructions stored in the memory.

The DCCO module 200 is configured to receive one or more deceleration input conditions 222, along with a piston position signal 226. Accordingly, the DCCO module 200 is configured to invoke a DCCO mode based on the presence of one or more of the detected deceleration input conditions 222. The deceleration input conditions 222 include, but are not limited to, zero accelerator pedal position, zero acceleration of the accelerator pedal (i.e., the accelerator pedal is not depressed), and/or zero torque request.

While the DCCO mode is invoked, the DCCO module 200 outputs a valve control signal 212 to a valve assembly 152 based on a position of the piston indicated by the piston position signal 226. The valve assembly 152 includes the intake valve 122, the exhaust valve 130, the intake camshaft 140, the exhaust camshaft 142, the intake phaser 148 and the exhaust phaser 150 (see FIG. 1).

In at least one embodiment, the valve control signal 212 operates a valve disable system 215. The valve disable system 215 controls oil flow responsible for enabling or disabling one or more of the cylinders 118. For example, the valve control signal 212 can activate oil flow or deactivate oil flow which adjusts a position of an injector valve engagement pin (not shown). When the pin is engaged, the injector valve can be adjusted (e.g., opened or closed) based on the position of the phaser. When, however, the pin is disengaged, the injector valve remains closed regardless of the position of the phaser. In this manner, the intake cam phaser 148 can be varied to pre-set the intake cams to a targeted position while the intake valves 122 and/or exhaust valves 130 remain closed.

When the piston position indicated by the piston position signal 226 reaches the position threshold following exiting of the DCCO mode, the DCCO module 200 outputs the valve control signal 212 to re-engage the camshafts so that the exhaust valve 130 and/or the intake valve 122 can be opened at the pre-set position set by the intake phasers and exhaust phasers while the DCCO mode was invoked. The pre-set position can effectively delay the opening of the intake valve 122 upon exit of the DCCO mode, thereby controlling the amount of air drawn into the cylinder 118 upon DCCO exit. Although the intake valve 122 is described above, it should be appreciated that the exhaust valve 130 can be controlled (e.g., delayed) in a similar manner. The position of the exhaust valve 130 and/or the intake valve 122 can then be further adjusted according to the phaser control module 210 as described in greater detail below.

The throttle control signal 214 controls the position of the throttle valve 112 (see FIG. 1). In response to invoking the DCCO mode, the throttle control signal 214 commands the throttle valve 112 into the closed position, thereby inhibiting or fully blocking air flow drawn into the intake manifold 110.

The DCCO status signal 216 indicates whether the DCCO mode is activated or deactivated. For instance, a logic "1" value can indicate that the DCCO mode is activated, where as a logic "0" value can indicate that the DCCO mode is deactivated. When the DCCO status signal 216 indicates that the DCCO mode is deactivated, the phaser control module 210 can adjust the intake and exhaust phasers 148 and 150 (see FIG. 1) according to a normal timing schedule.

Figure 3:
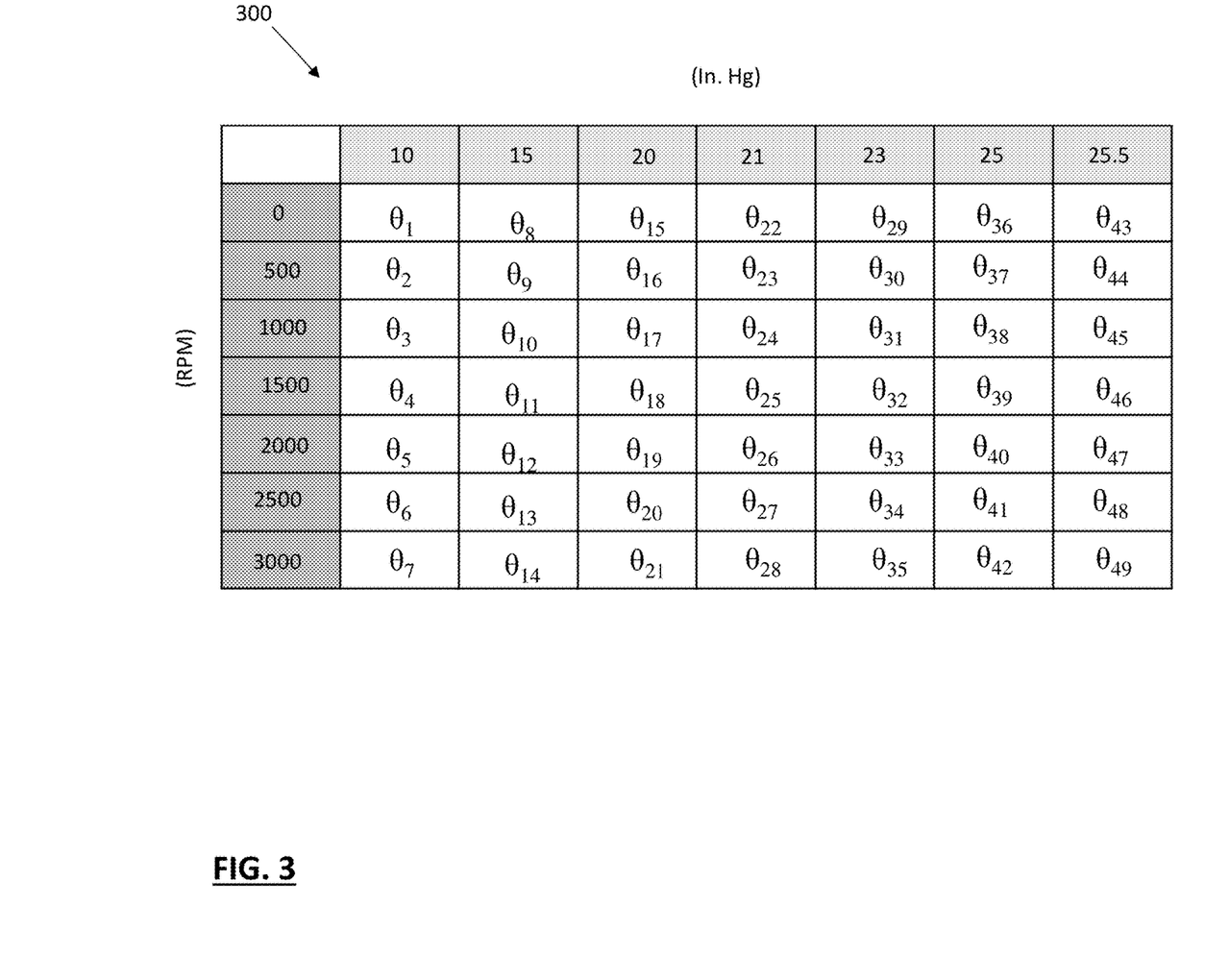
FIG. 3 is a look-up table utilized by a cylinder actuator module when operating in a DCCO mode according to a non-limiting embodiment.

When, however, the DCCO status signal 216 indicates that the DCCO mode is activated, the phaser control module 210 invokes a phaser override mode and operates the intake and exhaust phasers 148 and 150 according to a DCCO mode position look-up table (LUT) 300, which overrides the normal valve timing schedule. In some embodiments, multiple DCCO mode position LUTs 300 can be utilized when both an intake phaser 148 and an exhaust phaser 150 are included in the engine system 100. In other embodiments, a single LUT 300 can be utilized when a single phaser and camshaft are installed on the engine system 100.

FIG. 3 illustrates an example of a DCCO mode position LUT 300. The DCCO mode position LUT 300 can indicate a position ($\theta_x$) of a phaser 148 and/or 150 based on a current engine speed (RPM) and current intake manifold pressure (In. Hg). Accordingly, the DCCO mode position LUT 300 allows the air target value to be changed based on the current operating conditions of the vehicle. In this manner, a reduced amount of air can be drawn into the cylinder 118 during the DCCO mode compared to previously designed DCCO systems so that output torque can be controlled (e.g., reduced) when the cylinder is re-activated.

In at least one embodiment, the phaser position ($\theta_x$) sets the position of an intake valve that will take effect after exiting the DCCO mode. Accordingly, an amount of air drawn into the cylinder 118 equals or at least meets an air target value after exiting the DCCO mode. In at least one embodiment, the air threshold value represents a maximum amount of air allowed into the cylinder after exiting the DCCO mode at the current engine speed (RPM) and current intake manifold pressure. In at least one embodiment, the maximum amount of air set by the air target value is less than a maximum amount of air that can be drawn into the cylinder 118, e.g., less than the maximum sweep volume of the cylinder 118. In at least one embodiment, the phaser position can reduce the air per cylinder (APC) by about 35% compared to previously designed DCCO systems which draw in the maximum amount of air into the cylinders upon DCCO exit.

When the DCCO mode is exited, the DCCO control module 200 outputs the DCCO status signal 216 indicating deactivation of the DCCO mode. Accordingly, the phaser control module 210 reverts back to operating the phaser(s) 148 and 150 according to the normal timing schedule after combusting the reduced amount of air following re-activation of the cylinders.

The DFCO module 202 is configured to invoke a DFCO mode in response to receiving the DFCO mode request signal 218. When invoked, the DFCO mode disables fuel delivery to one or more cylinders 118. In this manner, fuel is not injected into a deactivated cylinder 118.

Still referring to FIG. 2, the DCCO module 200 maintains the DCCO mode until receiving one or more DCCO exit input conditions 224. The DCCO exit input conditions 224 include, but are not limited to, a change in accelerator pedal position, a change in acceleration of the accelerator pedal (i.e., the accelerator pedal is not depressed), and/or a change in torque request (e.g., positive torque increase). In response to detecting the DCCO exit input(s) 224, the DCCO module 200 outputs the DCCO status signal 216 (e.g., value "0") indicating that the DCCO mode is deactivated, while deactivating the throttle control signal 214 to allow opening of the throttle valve.

The DCCO module 200 also commands the DFCO control module 202 to deactivate the DFCO mode using the DFCO mode request signal 218. In response to receiving the DFCO mode request signal 218, the DFCO control module 202 outputs one or more torque command signals 220 to the engine torque control module 204. The torque command signals 220 include, for example, a throttle request signal, a spark timing signal, and a fuel amount signal. The throttle request signal can indicate a predicted throttle request input by a driver. The spark timing signal and the fuel amount signal can indicate a predicted spark timing and predicted fuel amount to be injected into the cylinders to achieve the predicted torque.

The engine torque control 204 receives the torque command signals 220, along with an engine speed (RPM) signal 228 and an intake manifold pressure signal 230. Based on the torque command signals 220, the engine torque control module 204 adjusts the position of the throttle valve 122, and initiates fuel delivery into the cylinder 118 along with spark timing to initiate combustion according to the detected change in accelerator pedal position, change in acceleration of the accelerator pedal, and/or a change in torque request.

As described herein, the phaser control module 210 can employ a DCCO mode position LUT 300 which sets the position ($\theta_x$) of a phaser based on a current engine speed (RPM) and current intake manifold pressure. The phaser position ($\theta_x$) during the DCCO mode sets the position of an intake valve 122 and/or exhaust valve 130 so that the amount of air drawn into the cylinder 118 is below an air threshold value. In this manner, a reduced amount of air is retained in the cylinder 118 upon exiting the DCCO mode compared to previously designed DCCO systems. Accordingly, the amount of torque output from the cylinder 118 upon exiting the DCCO mode is more precisely controlled and the cylinder 118 can be re-activated while reducing undesirable disturbances, vibrations, and noise.

Figure 4:
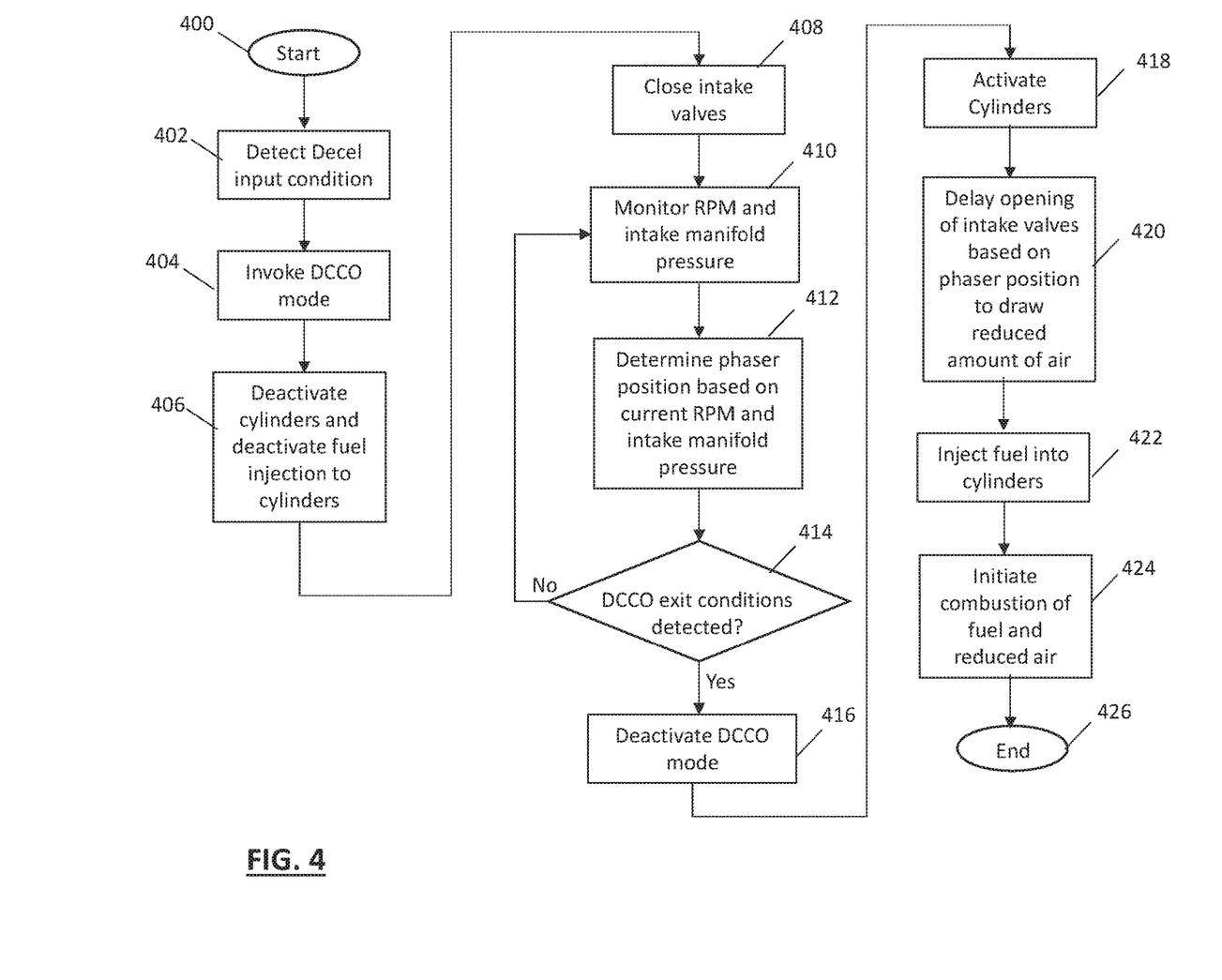
FIG. 4 is a method of operating an engine system in a DCCO mode according to a non-limiting embodiment.

FIG. 4 is a flow diagram 400 illustrating a method of operating an engine system that employs DCCO according to a non-limiting embodiment. The method begins at operation 401, and at operation 402 a deceleration input condition is detected. At operation 404, a DCCO mode is invoked in response to the detected deceleration input condition. At operation 406, one or more cylinders are deactivated and fuel injection to the deactivated cylinders is stopped. At operation 408, the intake valves of each cylinder are closed. Although closing of the intake valves are described after deactivating the cylinder, it should be appreciated that the intake valves can be disengaged prior to stopping fuel injection so as to deactivate the cylinders.

Turning to operation 410, the engine speed (RPM) and intake manifold pressure of the vehicle are monitored. At operation 412, a phaser position ($\theta_x$) for delaying opening of the intake valves upon exit of the DCCO mode is determined based on the current engine speed (RPM) and the current intake manifold pressure. Accordingly, the phaser position is adjusted such that opening of the intake valves (along with the exhaust valves in some non-limiting embodiments) is delayed upon exiting the DCCO mode. At operation 414, a determination is made as to whether one or more DCCO exit conditions are detected. The DCCO exit conditions include, for example, a change in accelerator pedal position, a change in acceleration of the accelerator pedal (i.e., the accelerator pedal is not depressed), and/or a change in torque request (e.g., positive torque increase). When the DCCO exit conditions are not detected, the method returns to operation 410 and continues monitoring the engine speed and intake manifold pressure.

When, however, the DCCO exit conditions are detected the DCCO mode is deactivated at operation 416. At operation 418, the cylinders are re-activated and the opening of the intake valves is delayed based on the phaser position at operation 420. Accordingly, a reduced amount of air is drawn into the cylinders upon re-activating the cylinder after exiting the DCCO mode. In at least one embodiment, the reduced amount of air drawn into each cylinder equals or at least meets an air target value determined to produce a targeted reduced torque output from the engine. At operation 422, fuel is injected into the cylinders, and the mixture of fuel and the reduced amount of air is combusted at operation 424. Accordingly, a reduced torque output following the exit of the DCCO mode is generated, and the method ends at operation 426. Because the DCCO system described according to various embodiments herein reduces the amount of air in the cylinders following DCCO exit compared to a vehicle operating according to a previously designed DCCO scheme, the torque output produced from combustion is reduced thereby decreasing disturbances, vibrations, and noise realized by the driver.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle comprising:
   an internal combustion engine including at least one cylinder;
   a valve assembly configured to activate and deactivate the at least one cylinder, the valve assembly including an intake valve configured to control air flow into the at least one cylinder; and
   an electronic controller configured to output a first control signal to the valve assembly to deactivate the at least one cylinder in response to detecting a deceleration event and to output a second control signal to command the valve assembly to delay opening the intake valve from a closed position after re-activating the at least one cylinder,
   wherein the internal combustion engine further comprises a piston reciprocably disposed in the at least one cylinder, and wherein the electronic controller outputs the second control signal based on a position of the piston after re-activating the at least one cylinder.

2. The vehicle of claim 1, wherein the electronic controller outputs the second control signal in response to the position of the piston reaching a position threshold.

3. The vehicle of claim 2, wherein an amount of air drawn into the at least one cylinder meets an air target value in response to opening the intake valve.

4. The vehicle of claim 3, wherein the air target value changes based on at least one current operating condition of the vehicle.

5. The vehicle of claim 4, wherein the air target value is less than a maximum sweep volume of the at least one cylinder, and wherein the at least one current operating condition includes engine speed and intake manifold pressure.

6. The vehicle of claim 3, wherein the electronic controller re-activates the at least one cylinder in response to detecting a torque request, and the internal combustion engine combusts a mixture of fuel and the amount of air set at the air target value in response to re-activating the at least one cylinder.

7. An engine control system comprising:
   at least one cylinder including a piston reciprocably disposed therein;
   a valve assembly configured to activate and deactivate the at least one cylinder, the valve assembly including an intake valve configured to control airflow into the at least one cylinder; and
   a deceleration cylinder cutoff (DCCO) controller configured to output a deactivation control signal to the valve assembly to deactivate the at least one cylinder in response to detecting a deceleration event,
   wherein the DCCO controller outputs a valve close control signal to the valve assembly to close the intake valve in response to deactivating the at least one cylinder and outputs a valve open control signal to the valve assembly to delay opening the intake valve based on a position of the piston after re-activating the at least one cylinder, and
   wherein delaying the opening of the intake valve draws a reduced amount of air into the at least one cylinder after re-activating the at least one cylinder.

8. The engine control system of claim 7, wherein the reduced amount of air equals an air target value.

9. The engine control system of claim 7, wherein the DCCO controller outputs the valve open control signal in response to the position of the piston reaching a position threshold.

10. The engine control system of claim 9, wherein the position threshold is a position that is half-way through a first stroke of the piston after re-activating the cylinder.

11. The engine control system of claim 10, wherein the DCCO controller outputs a cylinder activation control signal to re-activate the at least one cylinder in response to detecting a torque request.

12. The engine control system of claim 11, wherein a mixture of fuel and the reduced amount of air being equal to the air target value is combusted in response to re-activating the at least one cylinder.

13. A method of controlling an internal combustion engine, the method comprising:
    displacing a piston that is reciprocably disposed in a cylinder of the internal combustion engine;
    controlling air flow into the cylinder via an intake valve controlled by a valve assembly;
    detecting, via a deceleration cylinder cutoff (DCCO) controller, a deceleration event of the internal combustion engine;
    outputting, via the DCCO controller, a deactivation control signal to command the valve assembly to deactivate the cylinder in response to detecting the deceleration event;
    outputting, via the DCCO controller, a valve open control signal to the valve assembly to delay opening the intake valve based on a position of the piston after re-activating the cylinder; and
    drawing a reduced amount of air into the cylinder in response to delaying opening of the intake valve.

14. The method of claim 13, wherein the reduced amount of air drawn into the cylinder equals an air target value.

15. The method of claim 13, further comprising outputting, via the DCCO controller, the valve open control signal in response to determining the position of the piston reaches a position threshold so that the reduced amount of air is less than a maximum sweep volume of the cylinder.

16. The method of claim 15, further comprising:
monitoring a first stroke of the piston after re-activating the cylinder; and
determining the position threshold is reached in response to detecting the position of the piston is half-way through the first stroke.

17. The method of claim 16, further comprising:
detecting a torque request while the cylinder is deactivated;
outputting, via the DCCO controller, a cylinder activation control signal to re-activate the cylinder in response to detecting a torque request; and
combusting a mixture of fuel and the reduced amount of air being equal to the air target value in response to re-activating the cylinder.

* * * * *